United States Patent [19]

Min et al.

[11] Patent Number: 5,505,807
[45] Date of Patent: Apr. 9, 1996

[54] ACTUATED MIRROR ARRAY AND METHOD FOR THE FABRICATING THEREOF

[75] Inventors: Yong-Ki Min; Dong-Kuk Kim, both of Seoul, Rep. of Korea

[73] Assignee: Daewoo Electronics Co., Ltd., Seoul, Rep. of Korea

[21] Appl. No.: 278,660

[22] Filed: Jul. 21, 1994

[30] Foreign Application Priority Data

Jul. 21, 1993 [KR] Rep. of Korea ............... 93-13844
Jul. 21, 1993 [KR] Rep. of Korea ............... 93-13845

[51] Int. Cl.$^6$ .................................................. B32B 31/00
[52] U.S. Cl. ........................... 156/230; 156/236; 216/36
[58] Field of Search ................................. 156/230, 233, 156/234, 235, 239, 150, 151, 625, 236; 216/36

[56] References Cited

U.S. PATENT DOCUMENTS 4,441,791  4/1984  Hornbeck ........................... 350/360
4,826,553  5/1989  Armitage et al. .................. 156/233

Primary Examiner—James Engel
Attorney, Agent, or Firm—Anderson Kill Olick & Oshinsky

[57] ABSTRACT

The present invention relates to improved methods for fabricating and mounting an array of M×N mirrors on an array of M×N electrodisplacive actuators to thereby form an array of M×N electrodisplacive actuated mirrors for use in an optical projection system, wherein M and N are integers. In accordance with the present invention, there are provided two methods, one of the methods comprising the steps of: forming a separation layer on a substrate; providing a supporting layer on the separation layer; bonding the array of M×N actuators on the supporting layer; removing the separation layer so as to disengage the substrate; patterning the supporting layer into an array of M×N supporting members; and forming a light reflecting metallic layer on top of each of the supporting members to thereby provided the array of M×N electrodisplacive actuated mirrors. The other method comprises the steps of: forming a separation layer on a substrate; providing a reflection layer on top of the substrate; creating an array of M×N reflectors on the separation layer from the reflection layer formed thereon; providing a supporting layer; patterning the supporting layer into M×N disjointed supporting members; bonding the array of M×N actuators; and removing the separation layer to thereby provide the array of M×N electrodisplacive actuated mirrors.

7 Claims, 5 Drawing Sheets

ACTUATED MIRROR ARRAY AND METHOD FOR THE FABRICATING THEREOF

FIELD OF THE INVENTION

The present invention relates to an array of electrodisplacive actuated mirrors for use in an optical projection system; and, in more particular, to an improved method for fabricating and mounting an array of mirrors on an array of electrodisplacive actuators to thereby form an array of electrodisplacive actuated mirrors for use in the system.

BACKGROUND OF THE INVENTION

Video display systems generally display an image in arrays of pixels. Among various video display systems, an optical projection system is known in the art to be capable of providing a high quality video display in a large scale. In one particular optical projection system, light from a lamp is uniformly illuminated onto an array of, e.g., M×N actuated mirrors, wherein each of the M×N mirrors is coupled with each of the M×N actuators. The actuators are made of an electrodisplacive material such as a piezoelectric or an electrostrictive material which deforms in response to electrical signals applied thereto.

The reflected light beam from each of the mirrors is incident upon an aperture. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as projection lens, thereby offering a displayed image thereon.

The present invention concerns primarily with a method for fabricating and mounting an array of M×N mirrors on an array of M×N electrodisplacive actuators to thereby form an array of M×N electrodisplacive actuated mirrors for use in the optical projection system described above.

There are illustrated in FIGS. 1A to 1F one of the conventional fabrication processing sequences of an array of M×N mirrors. It involves, first, as shown in FIG. 1A, formation of a separation layer 3 on a flat top surface of a substrate 1. The formation of the separation layer 3 is carried out by spin-coating of a photoresist. Then a first metallic layer 5 is deposited on top of the separation layer 3 by using, e.g., sputtering. The first metallic layer 5 is for reflecting incident light beams and is made of a light reflecting metal such as aluminum (Al). Subsequently, a second and a third metalliclic layers 6,7 are applied on the first metalliclic layer 5 by using a similar technigne used in the formation of the first layer 5. The second metallic layer 6 functions as an intermediate layer for conferring good adhesivity between the first metallic layer 5 and the third metallic layer 7. Copper (Cu) and nickel(Ni) are commonly used for the second layer 6 and the third metallic layer 7, respectively.

In the subsequent step, the metallic layers 5,6,7 are patterned into an M×N mirror array structure 20 by employing a conventional photolithography process, as shown in FIG. 1B. In the following step as shown in FIG. 1C, a photoresist layer 11, composed of the same photoresist as used in the separation layer 3, is applied onto the structure treated in FIGS. 1A to 1B, and subsequently defined for exposing the top surface of the third metallic layer 7. The exposed surface acts as a seed in the following electroplating process.

Thereafter, a fourth metallic layer 13, composed of the same metallic as the one used in the forming of the third metallic layer 7, is electroplated, as shown in FIG. 1D, on the surface of the third metallic layer 7 not covered by the photoresist layer 11. An M×N actuator array 15 is then bonded on the surface of the fourth metallic layer 13 such that each of the actuators, e.g., 17, in the M×N actuator array 15 is aligned with each of the M×N mirrors in the M×N mirror array structure 20 as shown in FIG. 1E, wherein each of the M×N mirrors is comprised of the metallic layers 5,6,7 and 13.

The photoresist layer 11 is then removed with the separation layer 3 concurrently to thereby disengage the substrate 1; and the formation of the M×N mirror array 21 is finalized as shown in FIG. 1F. The fourth metallic layer 13 serves as a supporting layer for preventing the first metallic layer 5, which has a substantially larger surface area than that of the actuator, from sagging; and, therefore, the formation of the fourth metallic layer 13 is carried out by such an electroplating technique that can provide a sufficient thickness for such purpose.

In the above-described fabrication process for an M×N mirror array 21, as illustrated in FIGS. 1A to 1F, it involves the formation of multiple metalliclic layers, including a cumbersome electroplating process; and, therefore, the processing steps tend to be complicated and costly.

SUMMARY OF THE INVENTION

It is, therefore, an object of the present invention to provide an improved method for fabricating and mounting an array of M×N mirrors on an array of M×N actuators, wherein M and N are integers, which dispenses with the use of electroplating process to thereby substantially simplify the fabrication steps.

In accordance with the present invention there is provided a method for fabricating and mounting an array of M×N mirrors on an array of M×N actuators, each of the M×N actuators being made of an electrodisplacive material which deforms in response to an electrical signal applied thereto; each of the M×N mirrors having an identical size and reflecting a ray of light incident thereon in accordance with a deformation of each of the M×N actuators coupled thereto to thereby modulate an optical path of the reflected light, and including a reflector having a flat surface for reflecting the ray of light incident thereon and a supporting member for sustaining the flatness of the reflector incorporated therewith; and further top of each of the M×N mirrors is substantially larger than that of each of the M×N actuators, said method comprising the steps of:

(a) forming a separation layer on a substrate;

(b) providing a supporting layer made of a nonconducting material on the separation layer;

(c) bonding the array of M×N actuators on the supporting layer;

(d) removing the separation layer so as to disengage the substrate by dissolving it with a solvent;

(e) patterning the supporting layer into an array of M×N identically sized disjointed supporting members; and (f) forming a light reflecting metallic layer on top of each of the M×N supporting members.

In accordance with the present invention, there is provided yet another method for fabricating and mounting an array of M×N mirrors on an array of M×N actuators, each of the M×N actuators being made of an electrodisplacive material which deforms in response to an electrical signal applied thereto; each of the M×N mirrors having an identical size and reflecting a ray of light incident thereon in accordance with a deformation of each of the M×N actuators coupled thereto to thereby modulate an optical path of the reflected light, and including a reflector having a flat surface for reflecting the ray of light incident thereon and a supporting member for sustaining the flatness of the reflector incorporated therewith; and further top of each of the M×N mirrors is substantially larger than that of each of the M×N actuators, said method comprising the steps of:

(a) forming a separation layer on a substrate;

(b) providing a reflection layer on top of the separation layer;

(c) creating an array of M×N reflectors on the separation layer from the reflection layer formed thereon;

(d) providing a supporting layer made of a nonconducting material on the substrate treated in accordance with said steps (a) to (c);

(e) patterning the supporting layer into M×N disjointed supporting members, each of the M×N supporting members being commensurate with each of the M×N reflectors so as to define an array of M×N mirrors on the separation layer;

(f) bonding an array of M×N actuators on the substrate treated in accordance with said steps (a) to (e) such that each of the M×N actuators is aligned with each of the M×N mirrors; and (g) removing the separation layer so as to disengage the substrate from the array of M×N mirrors by dissolving it witha a solvent to thereby provide an array of M×N actuated mirrors, comprising the array of M×N mirrors mounted on the array of M×N actuator.

BRIEF DESCRIPTION OF THE DRAWINGS

The present invention together with the above and other objects and advantages will become apparent from the following description of preferred embodiments given in conjunction with the accompanying drawings, wherein.

DETAILED DESCRIPTION OF THE PREFERRED EMBODIMENTS

Figure 1A:
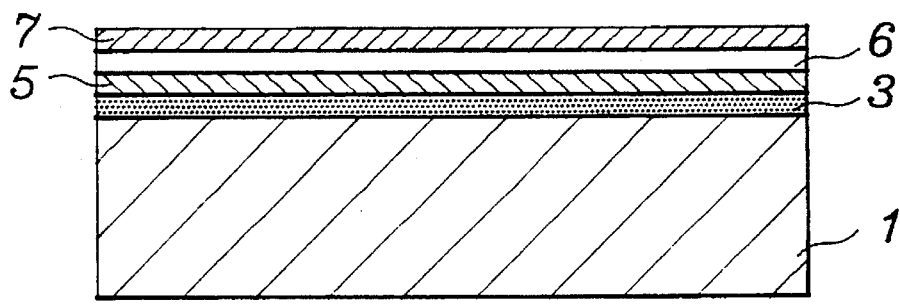
FIGS. 1A to 1F depict schematic cross sectional views illustrating a sequence of conventional fabricating and mounting process used in forming an array of mirrors on an array of actuators.
Figure 1B:
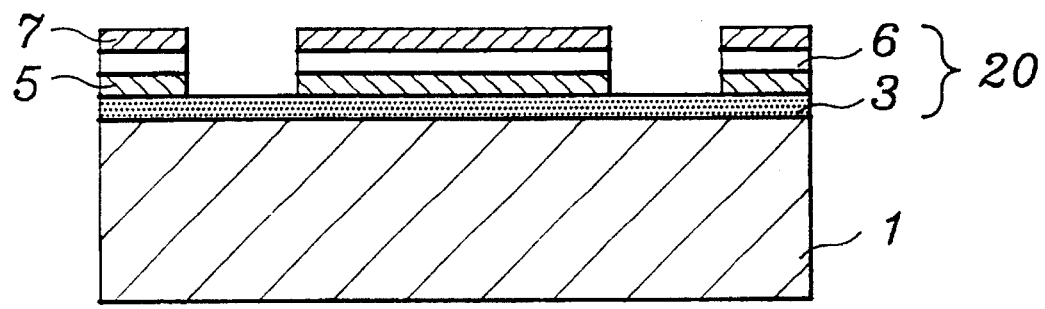
Figure 1C:
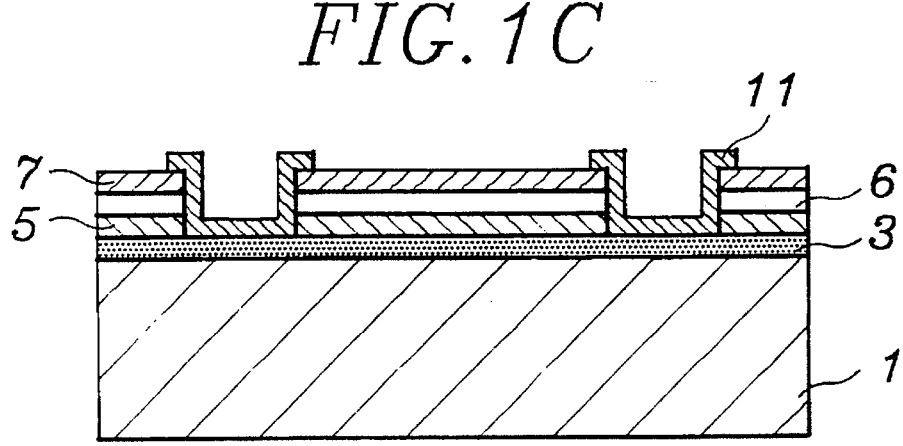
Figure 1D:
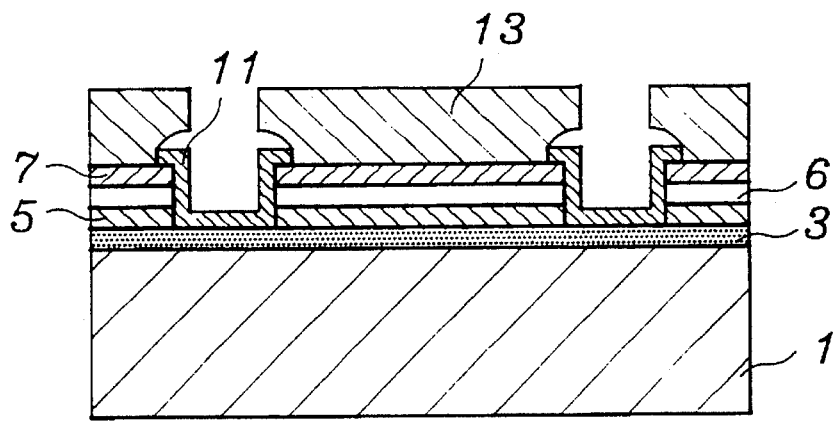
Figure 1E:
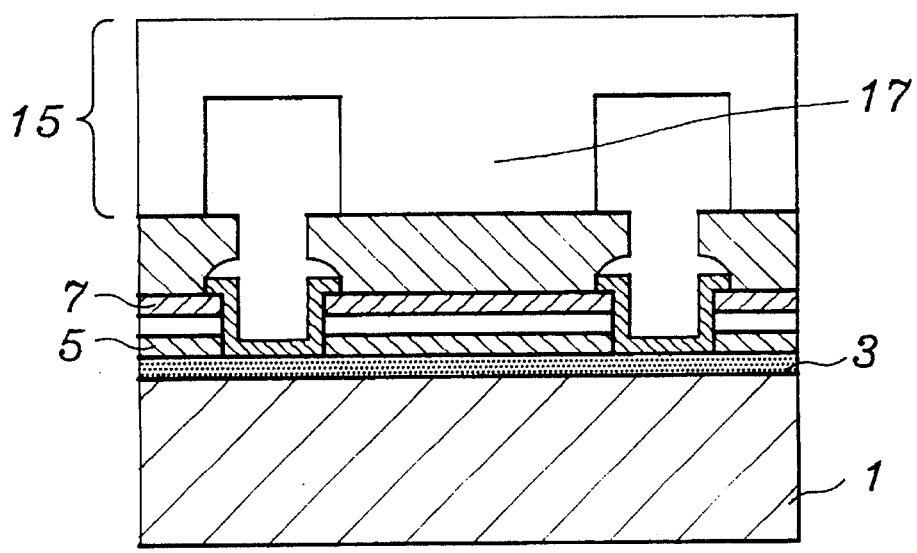
Figure 1F:
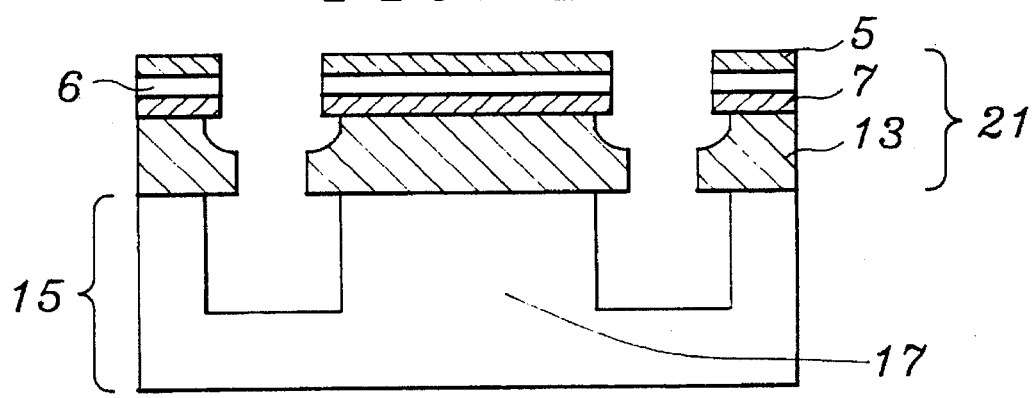

Referring now to FIGS. 2 and 3, there are provided inventive processes for fabricating and mounting an array of M×N mirrors on an array of M×N actuators, wherein M and N are integers, without having to employ an electroplating process in accordance with the preferred embodiments of the present invention. It should be noted that like parts appearing in FIGS. 2 and 3 have like reference numerals.

Figure 2A:
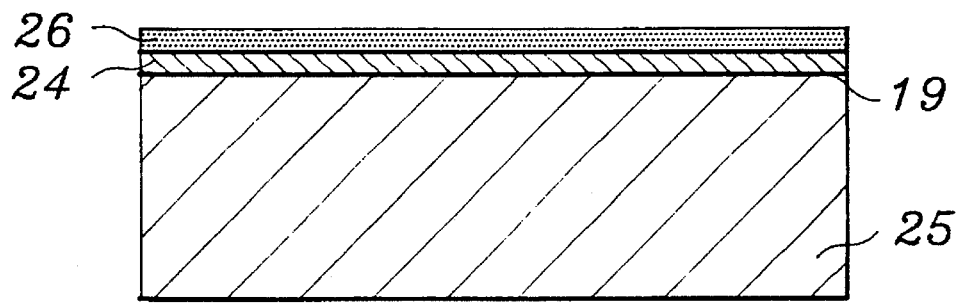
FIGS. 2A to 2C represent schematic cross sectional views showing the fabricating and mounting sequence in accordance with a preferred embodiment of the present invention.

As shown in FIG. 2A, a separation layer 24 is provided on a flat top surface 19 of a substrate 25. The separation layer 24 is made of a photoresist formed by spin coating or a water soluble polymer or an ionic compound, e.g., NaCl. The substrate 25 is preferably made of a glass resistant to chemical attacks for multiple usages.

In a subsequent step, a supporting layer 26, made of either an adhesive which solidifies when exposed to an ultraviolet light or the photoresist constituting the separation layer 24, is formed on top of the separation layer 24. This layer is used for defining the thickness of the mirror which will be formed at a later stage.

Figure 2B:
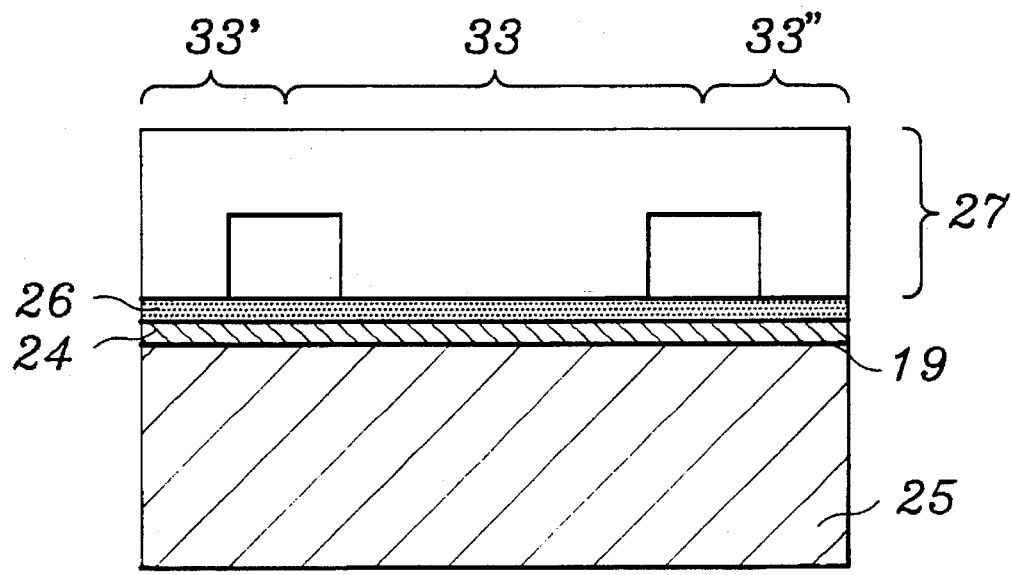

Thereafter, as shown in FIG. 2B, an array 27 of M×N actuators, e.g., 33, 33', 33", is bonded to the supporting layer 26 by using a bonding agent. The bonding agent is preferably electrically non-conductive in case each of the M×N actuators, e.g., 33, 33', 33", has such electrode configuration that both the reference and the bias electrodes appear on the top surface thereof.

Figure 2C:
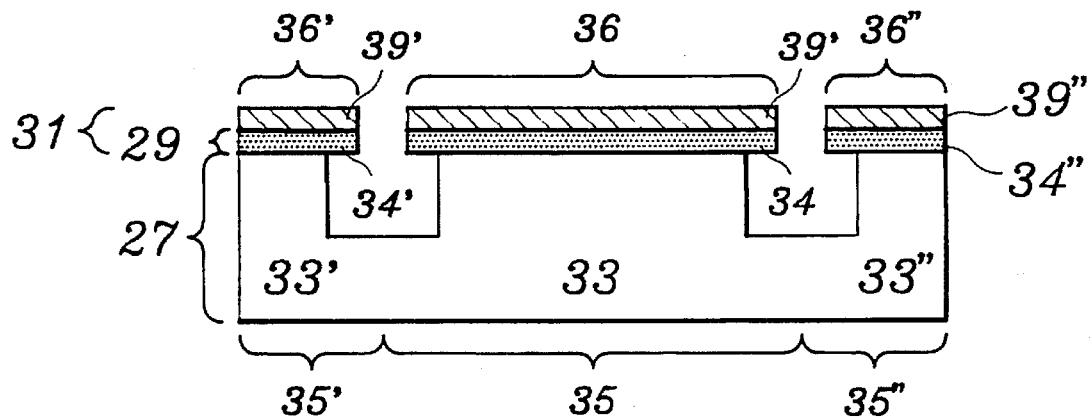

In subsequent steps, as shown in FIG. 2C, the separation layer 24 is removed so as to disengage the substrate 25 by dissolving the separation layer 24 using water; the supporting layer 26 is patterned into an array 29 of M×N identically dimensioned disjointed supporting members, e.g., 34, 34', 34", such that each of the M×N supporting members is coupled with each of the M×N actuators, e.g., 33, 33', 33"; and then finally a reflector, e.g., 39, made of a light reflecting material, e.g., aluminum (Al), is formed on top of each of the M×N supporting members using, e.g., a sputtering method or thermal evaporation technique, to thereby form an array 30 of actuated mirrors, e.g., 35, 35', 35", comprising an array 31 of M×N mirrors, e.g., 36, 36', 36", and an array 27 of actuators, e.g., 33, 33',33", wherein each of the M×N mirrors is coupled to each of the M×N actuators. The supporting layer 26 can be patterned into an array 29 of M×N identically sized disjointed supporting members, e.g., 34, 34', 34", by placing a mask on top thereof, exposing it under an ultraviolet light, and then removing the portions thereof which did not solidify. A gap which separates adjacent supporting members, and hence the mirrors, is defined to have a minimized width in order to maximize the reflection surface area, thereby increasing the optical efficiency.

It should be appreciated that the formation of the M×N supporting members, e.g., 34, 34', 34", can be performed during other processing steps than the steps specified hereinabove: for instance, the supporting layer 26 may be patterned into the M×N supporting members, e.g., 34, 34', 34", prior to the step for bonding the array 27 of M×N actuators, e.g., 33, 33', 33".

Further, it is preferred that the supporting layer 26 and the bonding agent be electrically non-conductive in case the actuator, e.g., 33, 33', 33", has such an electrode configuration that both the reference and the bias electrodes appear on the top surface thereof.

Referring to FIGS. 3A to 3D, there is provided a process for fabricating and mounting an array of M×N mirrors on an array of M×N actuators in accordance with another embodiment of the present invention.

Figure 3A:
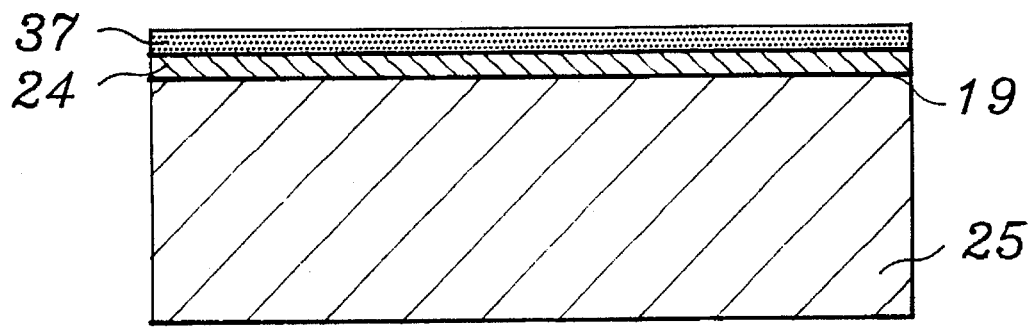
FIGS. 3A to 3D provide schematic cross sectional views describing the fabricating and mounting sequence in accordance with another preferred embodiment of the present invention.

As shown in FIG. 3A, a separation layer 24 is provided on a top flat surface 19 of a substrate 25. The separation layer 24 is made of a material that can be easily dissolved in water, e.g., an ionic compound such as NaCl or a water soluble polymer; and the substrate 25 is preferably made of a chemically resistant material, e.g., glass. In the next step, a reflection layer 37, made of a light reflecting material, e.g., Al, is deposited on the separation layer 24 by using, e.g., a sputtering method or a thermal evaporation technique. The separation layer 24 and the substrate 25 can be made of the same material constituting the separation layer 24, and in such a case, the separation layer 24 need not be formed.

Figure 3B:
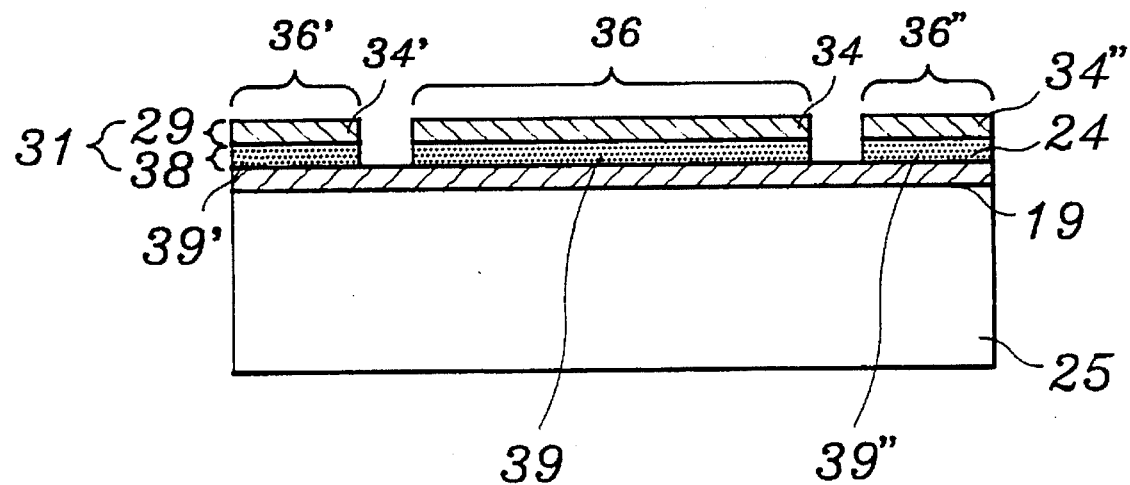

Thereafter, as shown in FIG. 3B, the reflection layer 37 is patterned into an array 38 of M×N identically sized disjointed reflectors, e.g., 39, 39', 39", by using a conventional photolithography process. A gap which separates adjacent reflectors is defined to have a minimized width in order to maximize the reflective surface area of each of the M×N reflectors, thereby increasing the optical efficiency. In the subsequent step, a supporting layer 26(not shown), used for defining the thickness of the mirrors made of a photoresist or an adhesive which solidifies under an ultraviolet light, is deposited on the substrate 25 treated in accordance with the above-described steps. Thereafter, the supporting layer 26 is patterned into an array 29 of M×N identically dimensioned supporting members, e.g., 34, 34', 34", by placing a mask with a desired pattern thereon on top thereof, exposing it under an ultraviolet light and then removing the portions thereof which did not solidify, wherein each of the M×N supporting members, e.g., 34, is commensurate with each of the M×N reflectors, e.g., 39, so as to define an array 31 of M×N mirrors, e.g., 36, 36', 36", on the separation layer 24.

Figure 3C:
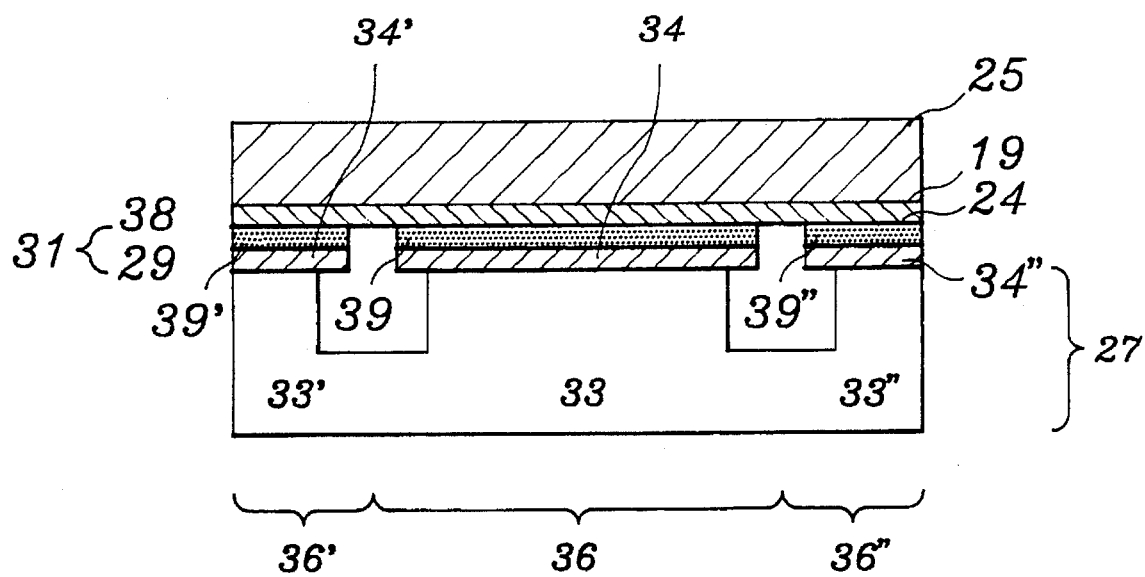

Subsequently, as shown in FIG. 3C, an array 27 of M×N actuators, e.g., 33, 33', 33", is bonded using a bonding agent to the substrate 25 treated in accordance with the above-described steps such that each of the M×N actuators, e.g., 33, is aligned with each of the M×N mirrors, e.g., 36, comprising a supporting member, e.g., 34, and a reflector, e.g., 39.

Figure 3D:
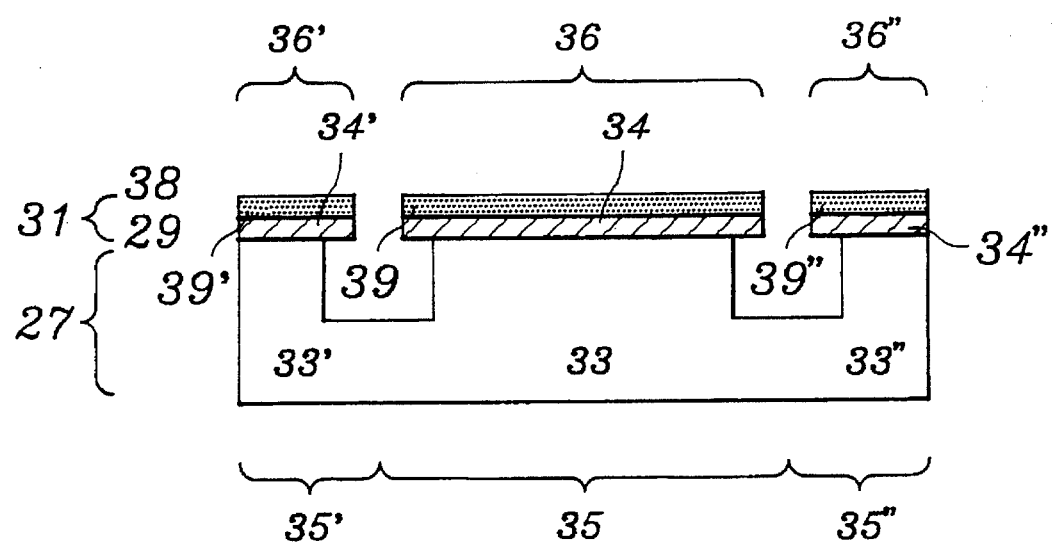

Thereafter, as shown in FIG. 3D, the separation layer 24 is removed so as to disengage the substrate 25 from the array 31 of M×N mirrors, e.g., 36, 36', 36", to thereby provide an array 30 of actuated mirrors, e.g., 35, 35', 35", comprising the array 31 of M×N mirrors and the array 27 of M×N actuators, wherein each of the M×N mirrors is coupled to each of the M×N actuators.

It should be appreciated that the formation of the M×N reflectors or the M×N supporting members can be performed during other processing steps than the steps specified hereinabove: for instance, they can be performed concurrently just prior to the step of bonding the array 27 of M×N actuators.

Further, it is preferred that the supporting layer 26 and the bonding agent be electrically non-conductive in case each of the M×N actuators has such electrode configuration that both the reference and bias electrodes appear on the top surface thereof.

While the present invention has been described with respect to the preferred embodiments only, other modifications and variations may be made without departing from the scope of the present invention as set forth in the following claims.

What is claimed is:

1. A method for fabricating and mounting an array of M×N mirrors on an array of M×N actuators to thereby form an array of M×N actuated mirrors for use in an optical projection system, wherein M and N are integers; each of the M×N actuators being made of an electrodisplacive material which deforms in response to an electrical signal applied thereto; each of the M×N mirrors having an identical size and reflecting a ray of light incident thereon in accordance with a deformation of each of the M×N actuators coupled thereto to thereby modulate an optical path of the reflected light, and including a reflector having a flat surface for reflecting the ray of light incident thereon; and top of each of the M×N mirrors is substantially larger than that of each of the M×N actuators, said method comprising the steps of:

(a) forming a separation layer on a substrate;

(b) providing a supporting layer on the separation layer;

(c) bonding the array of M×N actuators on the supporting layer;

(d) removing the separation layer so as to disengage the substrate by dissolving it with a solvent;

(e) patterning the supporting layer into an array of M×N identically sized, disjointed supporting members; and (f) forming a light reflecting metallic layer on top of each of the M×N supporting members.

2. The method of claim 1, wherein the separation layer is made of a material selected from the group consisting of a photoresist, an ionic compound and a water soluble polymer.

3. The method of claim 2, wherein the separation layer is made of the photoresist.

4. A method for fabricating and mounting an array of M×N mirrors on an array of M×N actuators to thereby form an array of M×N actuated mirrors for use in an optical projection system, wherein M and N are integers; each of the M×N actuators being made of an electrodisplacive material which deforms in response to an electrical signal applied thereto; each of the M×N mirrors having an identical size reflecting a ray of light incident thereon in accordance with a deformation of each of the M×N actuators coupled thereto to thereby modulate an optical path of the reflected light, and including a reflector having a flat surface for reflecting the ray of light incident thereon; and top of each of the M×N mirrors is substantially larger than that of each of the M×N actuators, said method comprising the steps of:

(a) forming a separation layer on a substrate;

(b) providing a reflection layer on top of the separation layer;

(c) creating an array of M×N reflectors on the separation layer from the reflection layer formed thereon;

(d) providing a supporting layer made of a nonconducting material on the substrate treated in accordance with said steps (a) and (c);

(e) patterning the supporting layer into M×N disjointed supporting members, each of the M×N supporting members being commensurate with each of the M×N reflectors so as to define an array of M×N mirrors on the separation layer;

(f) bonding the array of M×N actuators on the substrate treated in accordance with said steps (a) to (e) such that each of the M×N actuators is aligned with each of the M×N mirrors; and (g) removing the separation layer so as to disengage the substrate from the array of M×N mirrors by dissolving it with a solvent to thereby provide the array of M×N actuated mirrors.

5. The method of claim 4, wherein the supporting layer is made of either an adhesive which solidifies under an ultraviolet light or a photoresist.

6. The method of claim 5, wherein the reflection layer and the supporting layer are patterned into the array of M×N reflectors and the array of M×N supporting members, respectively, using an identical mask.

7. The method of claim 6, wherein the separation layer is made of a material selected from the group consisting of a photoresist, a water soluble polymer and an ionic compound.

* * * * *